United States Patent
Sussman et al.

[45] 3,680,948
[45] Aug. 1, 1972

[54] MODE ANNUNCIATION DISPLAY MEANS FOR AIRCRAFT INSTRUMENT PANELS

[72] Inventors: Arthur Sussman, Jersey City; Jack Nitzberg, Paramus, both of N.J.

[73] Assignee: The Bendix Corporation

[22] Filed: Dec. 11, 1969

[21] Appl. No.: 884,112

[52] U.S. Cl..................................350/96 B, 355/1
[51] Int. Cl..................................G02b 5/14
[58] Field of Search.......350/96 B; 355/1; 353/25, 40

[56] References Cited
UNITED STATES PATENTS 3,163,080  12/1964  Miller..........................350/96 B
2,992,587  7/1961  Hicks et al...................350/96 B
3,212,397  10/1965  Miller..........................350/96 B

*Primary Examiner*—David Schonberg
*Assistant Examiner*—Robert L. Sherman
*Attorney*—Anthony F. Cuoco and Plante, Hartz, Smith and Thompson

[57] ABSTRACT

Flight mode display means for an aircraft instrument panel, and which display means uses a tapered fiber optical bundle for magnifying images on a carrier electro-mechanically indexed to the viewing axis of the optical bundle.

8 Claims, 2 Drawing Figures

INVENTOR.
ARTHUR SUSSMAN

MODE ANNUNCIATION DISPLAY MEANS FOR AIRCRAFT INSTRUMENT PANELS

BACKGROUND OF THE INVENTION

1. Field of the Invention

This invention relates to flight mode display means for aircraft instrument panels and, more particularly, to display means of the type described using tapered fiber optical bundles for magnifying and transmitting flight mode indicating images to aircraft instrument panels.

2. Description of the Prior Art

Instrument panels on aircraft include display indicators which supply the pilot with mode information messages regarding the status of the aircraft flight guidance and autothrottle systems. Prior to the present invention display means of the type described required complicated optical systems and electrical circuitry, consumed valuable space and required that the pilot scan the instrument panel to determine or confirm his flight mode. The present invention overcomes these deficiencies by providing a relatively small package for displaying all flight mode indications at a single selected location on the instrument panel.

SUMMARY OF THE INVENTION

This invention contemplates an opto-mechanical system whereby a light source is positioned near the small end of a tapered fiber optical bundle. A message carrier carrying a plurality of flight mode indicating message is disposed intermediate the light source and the small end of the optical bundle. The message carrier is indexed to bring a message within the viewing axis of the bundle whereby a shadow image of the message is provided at the small end thereof and a magnified image appears at the large end. The magnified image is displayed through a slightly diffuse cover glass which serves to control the display viewing angle.

One object of this invention is to use fiber optics means for transmitting and magnifying remotely originated images.

Another object of this invention is to use a tapered fiber optical bundle for transmitting and magnifying the original image.

Another object of this invention is to use means of the type described for displaying flight mode messages regarding the status of aircraft control apparatus.

Another object of this invention is to provide said display means in a relatively small optical package.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

In the figures, wherein corresponding numerals indicate corresponding parts;

Figure 1:
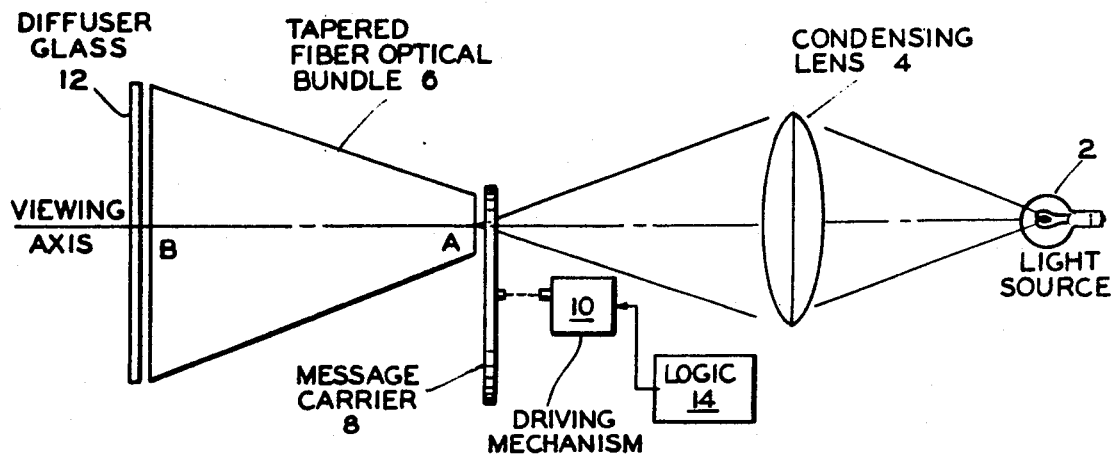
FIG. 1 is a diagrammatic representation of an optical device according to the invention.

With reference to FIG. 1, there is shown a light source 2, a condensing lens 4, a tapered fiber optical bundle 6, a message carrier 8, a driving mechanism 10, a diffusing lens 12 and logic device 14.

Light source 2 may consist of a miniature tungsten lamp and socket.

Message carrier 8 may be a rotary wheel or a linearly moving tape having a plurality of messages and indexed to the axis of optical bundle 6 by drive mechanism 10 in response to electrical outputs from logic device 14. The messages on carrier 8 are coded words descriptive of flight control mode status.

Optical bundle 6 is a cable of many fine strands of optical glass fibers which have the unique capability of transmitting light over a complex path with little loss of light or image brightness through the sides of the fiber. A tapered optical bundle such as the bundle 6 of the invention introduces the additional capability of magnifying the transmitted image. The construction of optical bundles is well known in the art and is described in the Bendix Technical Journal, Volume 2, Number 2, Summer 1969, published by The Bendix Corporation, Bendix Center, Southfield, Michigan. It will suffice to say for purposes of describing the present invention that optical bundle 6 is a coherent type bundle that has been formed into a tapered configuration without disturbing the spacial coherence between the two ends of the bundle. Light is transmitted through each of the fibers independent of the neighboring fibers and an image produced at one end of the bundle is duplicated at the other end.

An image of the filament of light source 2 is produced at the small end A of tapered fiber optical bundle 6. Message carrier 8 containing the mode messages is located close to small end A. When message carrier 8 is indexed to the viewing axis of bundle 6 by drive mechanism 10 in response to electrical outputs from logic device 14, a shadow image of the message appears at small end A of bundle 6. A magnified image of the message appears at large end B of the bundle. The magnification is provided in accordance with the following relationship:

$$M = A/B$$

where $A$ and $B$ are the areas of the large and small ends, respectively, of bundle 6. The display is viewed through diffused lens 12, and which lens 12 serves to control the display viewing angle.

It will be noted that the tapered optics approach practiced by the subject invention offers image magnification without the necessity of associated imaging optics and thus allows for a small, compact display unit. Additionally, since message carrier 8 may carry many messages, in practice as many as 128 different messages are employed, a large message display capacity is provided. Also, the optical bundle technique offers the desired magnification with no apparent loss of image resolution.

The advantages of a display device of the type described are appreciated when it is considered that modern aircraft require two display panels, one each for the pilot and co-pilot. The panels will inform the flight crew of the status of the associated aircraft control systems. The display panels when positioned will be approximately 1 inch in height, 4¾ inches in width and 5½ inches in depth. The panel will have four separate display channels with each channel having a minimum capacity of 12 messages. A message size of approximately three-quarters of an inch is to be offered at a display brightness of 500 foot lamberts maximum.

Figure 2:
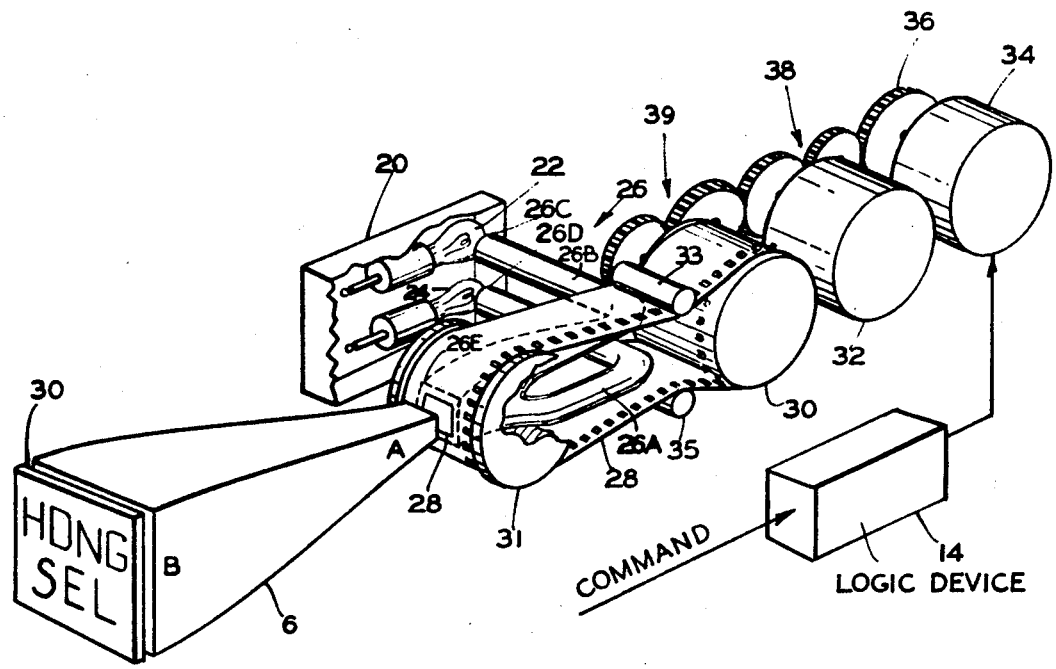
FIG. 2 is an isometric pictorial representation of a preferred embodiment of the invention.

With the foregoing in mind, a preferred embodiment of the invention will be described with reference to FIG. 2 which shows a light source assembly including a reflector 20 for increasing lighting efficiency and a pair of lamps 22 and 24 similar to lamp 2 in FIG. 1. Light from the lamps illuminates the input ends of a dual light pipe 26.

Light pipe 26 is semi-coherent bundle of optical fibers, i.e., the ends of the fibers in the bundle lack correspondence, and as such is not capable of transmitting an image. However, the light pipe serves as highly efficient means for transferring light energy and is thus useful in the application being described. Additionally, the dual light pipe offers means for providing a dual redundant lighting configuration to extend performance reliability. Further, it reacts as an infra-red absorber of heat from lamps 22 and 24 that might otherwise affect the mechanical properties of the message carrier.

Light pipe 26 has two branches 26A and 26B that meet to form a single stem 26C. This arrangement provides an evenly distributed redundant light output. As shown in FIG. 2, output stem 26C of dual light pipe 26 is positioned in close proximity to input end A of tapered fiber optical bundle 6. Lamps 22 and 24 are placed close to the two input ends 26C and 26D of light pipe 26. It is to be noted that the construction of dual light pipe 26 provides an additive light distribution at output end B of optical bundle 6, and failure of one of the lamps 22 and 24 will produce an even light reduction of one-half of the original display brightness.

In accordance with the above, light pipe 26 transfers light to input end A of tapered fiber bundle 6 with little loss of display brightness. A spectral filter 28 is positioned at the output end of light pipe 26 and converts white light from lamps 22 and 24 to the light color required of the display.

A message carrier or tape 28 is disposed between the output end of light pipe 26 and the input end A of tapered fiber optical bundle 6. Tape 28 is a continuous loop of 16 mm. photographic film. The film is mounted on a transport assembly including a sprocket drum 30, a front roller 31 and guides 33 and 35. When a message is indexed to the viewing axis of optical bundle 6, as will be hereinafter described, a shadow image of the message is provided at small end A of optical bundle 6 and a magnified image of the message appears at large end B thereof. Diffuser glass 30 positioned at output end B of bundle 6 expands the display viewing angle far beyond that which would be available in its absence. Diffuser glass 30 provides for wide angle viewing with no visual loss of display resolution.

Sprocket drum 30, a stepper motor 32 and a shaft encoder 34 are coupled by gears 36, 38 and 39 for driving message carrier 28. Encoder 34 may be for purposes of illustration, a 32 position shaft encoder. The encoder may be electrically coupled to a comparator circuit (not shown) within logic unit 14. During an operation sequence, stepper motor 32 is activated by a signal from the logic unit. The angular position of the encoder is monitored by the logic unit and is compared with an input command signal. Correspondence between the encoder signal and the compared command signal deactivates stepper motor 32, and encoder 34 assures that the correct message is displayed when the stepper motor is deactivated. Stepper motor 32 is a 90° type and will advance four messages per revolution.

It will now be seen from the foregoing description of the invention that the device features fiber optics means as a magnifying image conduit for providing high mode information message capacity. Fast response and small package dimensions result. The device offers many advantages over similar devices now known in the art with respect to reliability, display brightness, versatility, and input power requirements.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An image transmitting and magnifying system, comprising:
   a coherent bundle of tapered optical fibers;
   a light source positioned near the small end of the optical fibers;
   a message carrier carrying a plurality of messages and positioned between the light source and the small end of the optical fibers;
   indexing means for operating the message carrier;
   logic means connected to the indexing means for controlling the indexing means to align a message for viewing through the optical bundle; and
   the optical bundle, message carrier and light source cooperating
   to provide a shadow image of the message at the small end of the fibers and a magnified image at the large end of the fibers.

2. A system as described by claim 1, wherein the light source includes:
   a pair of miniature lamps; and
   a reflector disposed rearward of the lamps for increasing lighting efficiency.

3. A system as described by claim 2, with a light pipe for transmitting light from the light source and including:
   a bundle of optical fibers having a pair of branches meeting to form a single stem;
   each of the branches having an input end positioned in close proximity to a corresponding lamp in the light source;
   the single stem having an output end positioned in close proximity to the small end of the tapered optical fibers; and
   the message carrier disposed between the output end of the light pipe and the small end of the tapered optical fibers.

4. A system as described by claim 1, including:
   a transport assembly having a sprocket drum and a roller disposed at a distance from the sprocket drum;
   the message carrier being a continuous loop of film positioned on the transport assembly and arranged to be carried by the roller and sprocket drum thereof; and
   the indexing means being coupled to the sprocket drum for indexing the film when driven by the logic means.

5. A system as described by claim 4, wherein the indexing means includes:
a stepper motor coupled to the sprocket drum;
a shaft encoder coupled to the stepper motor;
the logic unit connected to the shaft encoder for comparing the angular position of the encoder with an input command signal; and
correspondence between the encoder position and the command signal being effective for de-activating the stepper motor to align a selected message on the message carrier for viewing through the optical bundle.

6. A system as described by claim 3, including:
a spectral filter positioned at the output end of the light pipe for converting light from the lamps to a predetermined color required of the display.

7. A system as described by claim 1, including:
a light pipe positioned intermediate the light source and the message carrier for efficiently transmitting light from the light source.

8. A system as described by claim 1, including:
an infra-red absorber of heat positioned intermediate the light source and the message carrier for absorbing heat that would otherwise affect the mechanical properties thereof.

* * * * *